(12) United States Patent
Zhou

(10) Patent No.: US 10,939,978 B2
(45) Date of Patent: Mar. 9, 2021

(54) HIGH-SPEED TURBINE DENTAL HANDPIECE ADAPTED FOR SINGLE SAFE USE

(71) Applicant: NINGBO HPDOVE DENTAL INSTRUMENTS CO., LTD., Ningbo (CN)

(72) Inventor: Zhanli Zhou, Ningbo (CN)

(73) Assignee: NINGBO HPDOVE DENTAL INSTRUMENTS CO., LTD., Ningbo (CN)

( * ) Notice: Subject to any disclaimer, the term of this patent is extended or adjusted under 35 U.S.C. 154(b) by 157 days.

(21) Appl. No.: 16/335,468

(22) PCT Filed: Jun. 24, 2016

(86) PCT No.: PCT/CN2016/087009
§ 371 (c)(1),
(2) Date: Mar. 21, 2019

(87) PCT Pub. No.: WO2017/206223
PCT Pub. Date: Dec. 7, 2017

(65) Prior Publication Data
US 2020/0015933 A1  Jan. 16, 2020

(30) Foreign Application Priority Data
Jun. 3, 2016 (CN) .......................... 201610385488.3

(51) Int. Cl.
*A61C 1/05* (2006.01)
*A61C 1/08* (2006.01)
*A61C 1/10* (2006.01)

(52) U.S. Cl.
CPC ................ *A61C 1/05* (2013.01); *A61C 1/088* (2013.01); *A61C 1/10* (2013.01)

(58) Field of Classification Search
CPC .. A61C 1/08; A61C 1/088; A61C 1/10; A61C 3/02
See application file for complete search history.

(56) References Cited

U.S. PATENT DOCUMENTS

| 4,619,614 A | 10/1986 | Baba et al. |
| 5,088,924 A * | 2/1992 | Woodward ............... A61B 1/24 433/126 |

(Continued)

FOREIGN PATENT DOCUMENTS

| CN | 1657017 A | 8/2005 |
| CN | 203736332 U | 7/2014 |

(Continued)

OTHER PUBLICATIONS

The World Intellectual Property Organization (WIPO) International Search Report and Written Opinion for PCT/CN2016/087009 dated Dec. 28, 2016 9 Pages.

*Primary Examiner* — Nicholas D Lucchesi
(74) *Attorney, Agent, or Firm* — Anova Law Group, PLLC

(57) ABSTRACT

The high-speed turbine dental handpiece adapted for single safe use comprises a nose, a handle connected to the rear end of the nose, a plug connector disposed at the rear end of the handle, and a clip ring for fixing the handle and the plug connector, wherein the plug connector is provided with a first fixing slot at a side wall, the tail end of the handle is provided with a second fixing slot matched with the first fixing slot, the inner wall of the clip ring is provided with bumps matched with the first fixing slot and the second fixing slot, and when the clip ring is hooped on the plug connector, the bumps are embedded into the first fixing slot and the second fixing slot to limit and fix the handle and the plug connector. The invention effectively prevents the disposable dental handpiece from being reused in various ways, (Continued)

it is simple in structure and convenient to detach and thus can be conveniently detached and destroyed after being used, and in addition, with the disposable light-emitting component, whether the dental handpiece is used can be identified simply and clearly. According to the inventor, the concept of "one handpiece for one patient for single use" as advocated by the WHO in the field of oral health can be achieved, effectively solving the problem of iatrogenic cross infection in the field of stomatology. The invention is similar to a disposable syringe but with a more complex structure as a dental handpiece.

9 Claims, 4 Drawing Sheets

(56) References Cited

U.S. PATENT DOCUMENTS

| | | | |
|---|---|---|---|
| 10,368,969 B2* | 8/2019 | Beiersdorf | F26B 9/003 |
| 2009/0061384 A1* | 3/2009 | Thomssen | A61C 1/08 |
| | | | 433/132 |
| 2009/0162811 A1 | 6/2009 | Chronister et al. | |
| 2013/0343011 A1* | 12/2013 | Heinrich | A61C 1/00 |
| | | | 361/749 |

FOREIGN PATENT DOCUMENTS

| | | |
|---|---|---|
| CN | 204394714 U | 6/2015 |
| CN | 204995593 U | 1/2016 |

* cited by examiner

HIGH-SPEED TURBINE DENTAL HANDPIECE ADAPTED FOR SINGLE SAFE USE

TECHNICAL FIELD

The invention relates to a dental handpiece and, in particular to a dental handpiece for single safe use.

BACKGROUND

Dental handpieces are necessary for dental or oral surgery, and have been disinfected in a complicated way with long time and high cost. To prevent cross infection of various diseases, there are disposable dental handpieces emerging in the market. However, some are trying to illegally recover used dental handpieces for reuse after disinfection, greatly impacting the physical and psychological health of patients. There are rules established for the destruction of disposable medical products, for example, the length of a disposable infusion tube that needs to be cut after use is standardized. Since the dental handpiece may produce a great sucking force when stops at a high speed, harmful substances such as viruses in the mouth may be sucked into the inside of the handpiece and contaminate the comprehensive therapeutic apparatus. At present, there is no reliable destruction structure mounted on the disposable dental handpiece on the market, for example, the patent for the invention entitled "HIGH-SPEED TURBINE DENTAL DRILL HANDPIECE FOR SINGLE USE" with the Publication No. of "1887236" in the China Patent Database, where primary injection compression molding is mainly used to change a product structure for reducing the cost, without any anti-reuse and anti-suction design points.

SUMMARY

To overcome the defect that the disposable dental handpiece in the prior art is prone to recovery and reuse, the invention provides a high-speed turbine dental handpiece adapted for single safe use.

The invention adopts the following technical solution for solving the technical problem above: a high-speed turbine dental handpiece adapted for single safe use comprises a nose, a handle connected to the rear end of the nose, a plug connector disposed at the rear end of the handle, and a clip ring for fixing the handle and the plug connector, wherein the plug connector is provided with a first fixing slot at a side wall, the tail end of the handle is provided with a second fixing slot matched with the first fixing slot, the inner wall of the clip ring is provided with bumps matched with the first fixing slot and the second fixing slot, and when the clip ring is hooped on the plug connector, the bumps are embedded into the first fixing slot and the second fixing slot to limit and fix the handle and the plug connector. With the plug connector and the handle in the detachable configuration, the dental handpiece can be detached quickly and destroyed simply with ease to prevent reuse. Further, the clip ring is provided with a detachment opening at a side face, and can be detached by inserting a sharp object such as tweezers into the detachment opening and then pulling to remove the plug connector.

Further, the clip ring is semicircular, the bumps have a quantity of no less than one and are evenly distributed at the inner side of the clip ring.

Further, an extension strip extends from one end of the clip ring, a clip block is protrusively disposed on the outer surface at the other end of the clip ring, the extension strip is provided with a clip hole matched with the clip block, and after the clip ring is configured on the plug connector, the extension strip surrounds the plug connector and completely fix the clip ring on the plug connector by the matching of the clip hole and the clip block. With the extension strip, the clip ring can be detached just by grabbing and forcibly pulling one end of the extension strip, thereby removing the plug connector.

Further, the rear end of the handle is provided with a delivery tube, a rubber seal block is also provided, a through hole is disposed in the middle of the rubber seal block which is plugged and connected to the delivery tube through the through hole, the front and rear end faces of the rubber seal block are appressed and sealed when the plug connector is mounted at the rear end of the handle, and after the rubber seal block is pressed, the inner wall of the through hole and the outer wall of the delivery tube are appressed and sealed, and a flexible anti-return sheet extends from the tail end of the through hole in the rubber seal block, and a hole in the plug connector, matched with the through hole, has a cross-sectional area less than that of the anti-return sheet. Since part of gas may return to the comprehensive therapeutic apparatus from the dental handpiece due to the change of gas pressure at the moment when the dental handpiece stops working to result in contamination, the anti-return sheet is disposed to effectively prevent the gas from returning to protect the comprehensive therapeutic apparatus from contamination, thereby effectively preventing the patients from iatrogenic cross infection.

Further, the delivery tube is made of a thermally deformable material. It is necessary to disinfect the dental handpiece at a high temperature of 120° C. or above, therefore, an inner housing made of a thermally deformable material is deformable at high temperatures which makes it impossible to operate inside, achieving the purpose of preventing reuse again. Further, the nose is internally provided with the inner housing made of the thermally deformable material, through secondary injection molding, and the inner housing is located inside the nose for accommodating the side wall of the turbine of the dental handpiece. Further, the rear end face of a tail connector is provided with a groove which is internally provided with a water spray piece, the tail end of the water spray piece is provided with ports for air inlet and water inlet respectively, and the middle of the water spray piece is provided with a cavity for pooling water and gas. The water spray piece disposed independently can be pulled out after use to prevent reuse effectively.

Further, the dental handpiece also comprises a disposable light-emitting component; the handle is provided with a mounting site for mounting the disposable light-emitting component; the disposable light-emitting component comprises a battery, an LED and a cover plate; the bottom face of the mounting site is provided with a guide slot for guiding LED pins; the cover plate is provided with a battery mounting slot; and the cover plate or the handle is provided with a guide port allowing the head of the LED to pass. Light is emitted as long as the LED pins come into contact with the battery after the head of the LED is pushed in from the guide port, therefore, whether the dental handpiece is used can be simply and clearly identified with the disposable light-emitting component. Further, a snap clip is disposed on the side face of the mounting site, the side face of the cover plate is provided with a clip opening matched with the snap clip, and the cover plate is fixed on the handle through the matching of the snap clip and the clip opening. The invention has the following beneficial effects: the disposable dental handpiece is effectively prevented from reuse in a variety of manners, it is simple in structure and convenient to detach and thus can be conveniently detached and destroyed after being used, and in addition, with the disposable light-emitting component, whether the dental handpiece is used can be identified simply and clearly. According to the inventor, the concept of "one handpiece for one patient for single use" as advocated by the WHO in the field of oral health can be achieved, effectively solving the problem of iatrogenic cross infection in the field of stomatology. The invention is similar to a disposable syringe but with a more complex structure as a dental handpiece.

DETAILED DESCRIPTION

The invention will be further described in details below in conjunction with the accompanying drawings and particular embodiments.

Figure 1:
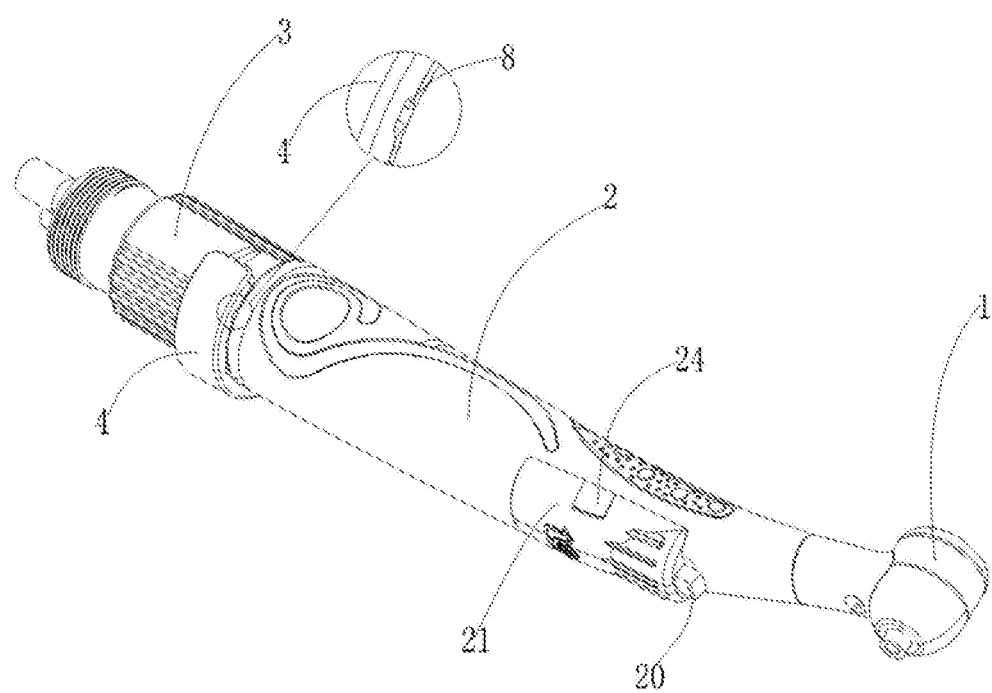
FIG. 1 is a three-dimensional view of the invention.
Figure 2:
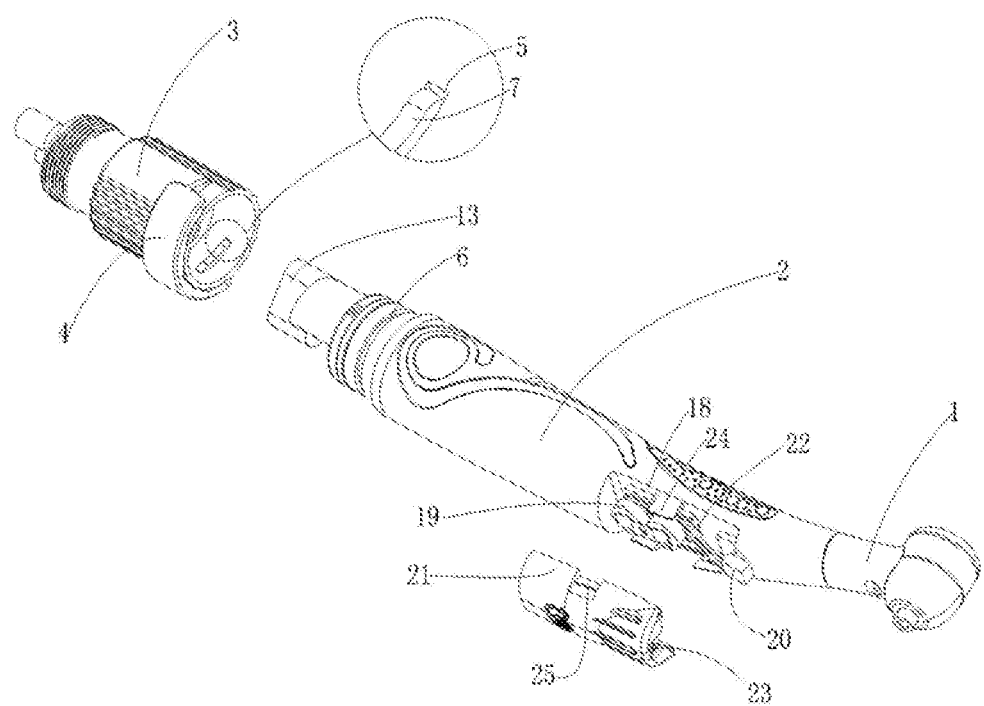
FIG. 2 is an exploded view of the invention.
Figure 3:
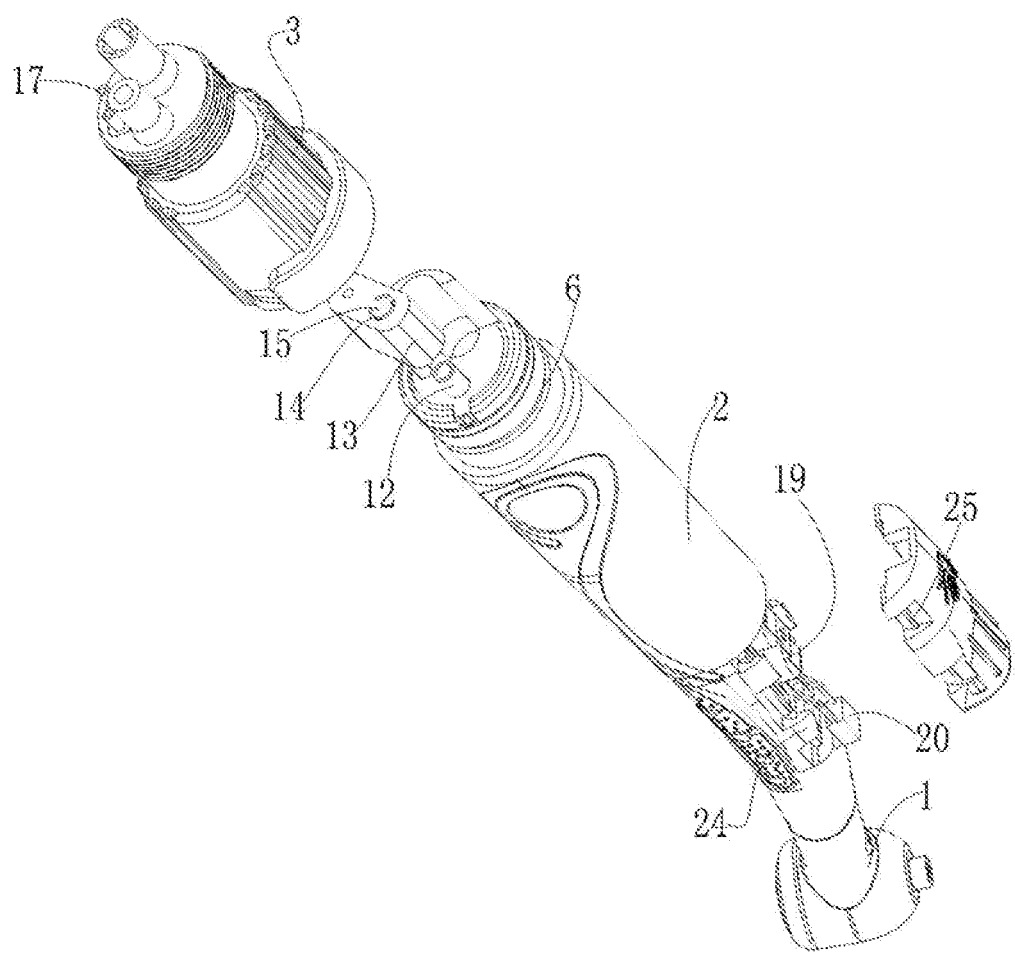
FIG. 3 is an exploded view of the invention from another perspective of view.

As shown in FIGS. 1, 2 and 3, a high-speed turbine dental handpiece adapted for single safe use comprises a nose 1, a handle 2 connected to the rear end of the nose 1, a plug connector 3 disposed at the rear end of the handle 2, and a clip ring 4 for fixing the handle 2 and the plug connector 3, wherein the plug connector 3 is provided with a first fixing slot 5 at a side wall, the tail end of the handle 2 is provided with a second fixing slot 6 matched with the first fixing slot 5, the inner wall of the clip ring 4 is provided with bumps 7 matched with the first fixing slot 5 and the second fixing slot 6, and when the clip ring 4 is hooped on the plug connector 3, the bumps 7 are embedded into the first fixing slot 5 and the second fixing slot 6 to limit and fix the handle 2 and the plug connector 3. With the plug connector and the handle in the detachable configuration, the dental handpiece can be detached quickly to prevent reuse.

The clip ring 4 is provided with a detachment opening 8 at a side face, and can be detached by inserting a sharp object such as tweezers into the detachment opening 8 and then pulling to remove the plug connector 3.

In this embodiment, the clip ring 4 is semicircular, the bumps 7 have the quantity of no less than one and are evenly distributed at the inner side of the clip ring 4.

Figure 4:
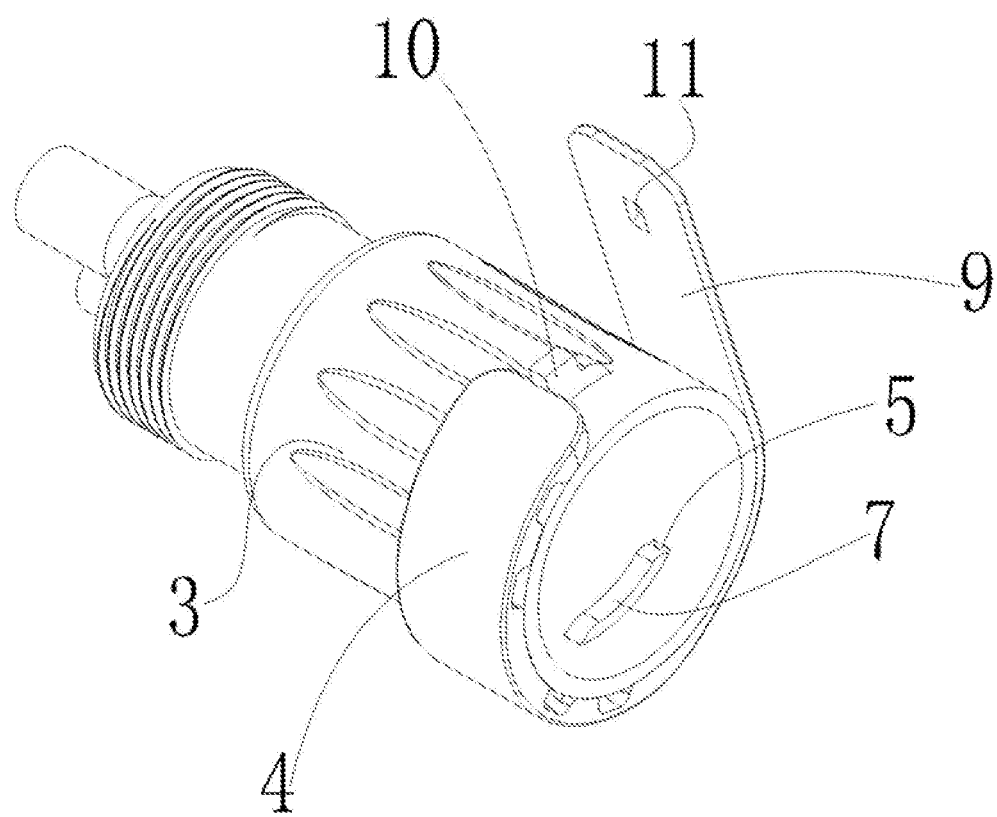
FIG. 4 is a schematic view of a plug connector with another clip ring fixing structure.

As shown in FIG. 4, for the convenience in detachment, the clip ring 4 can be also as follows: an extension strip 9 extends from one end of the clip ring 4, a clip block 10 is protrusively disposed on the outer surface at the other end of the clip ring 4, the extension strip 9 is provided with a clip hole 11 matched with the clip block 10, and after the clip ring 4 is configured on the plug connector 3, the extension strip 9 surrounds the plug connector 3 and completely fix the clip ring 4 on the plug connector 3 by the matching of the clip hole 11 and the clip block 10. With the extension strip, the clip ring can be detached just by grabbing and forcibly pulling one end of the extension strip, thereby removing the plug connector 3.

In this embodiment, the rear end of the handle is provided with a delivery tube 12, a rubber seal block 13 is also provided, a through hole 14 is disposed in the middle of the rubber seal block 13 which is plugged and connected to the delivery tube 12 through the through hole 14, the front and rear end faces of the rubber seal block 13 are appressed and sealed when the plug connector 3 is mounted at the rear end of the handle, and after the rubber seal block 13 is pressed, the inner wall of the through hole 14 and the outer wall of the delivery tube 12 are appressed and sealed; and a flexible anti-return sheet 15 extends from the tail end of the through hole in the rubber seal block, and a hole in the plug connector, matched with the through hole, has a cross-sectional area less than that of the anti-return sheet 15. Since part of gas may return to the comprehensive therapeutic apparatus from the dental handpiece due to the change of gas pressure at the moment when the dental handpiece stops working to result in contamination, the anti-return sheet is disposed to effectively prevent the gas from returning to protect the comprehensive therapeutic apparatus from contamination, thereby effectively preventing the patients from iatrogenic cross infection.

In this embodiment, the delivery tube is made of a thermally deformable material. It is necessary to disinfect the dental handpiece at a high temperature of 120° C. or above, therefore, an inner housing made of a thermally deformable material is deformable at a high temperature to make it impossible to operate inside, achieving the purpose of preventing reuse.

In this embodiment, the rear end face of the plug connector 3 is provided with a groove which is internally provided with a water spray piece 17, the tail end of the water spray piece 17 is provided with ports for air inlet and water inlet respectively, and the middle of the water spray piece 17 is provided with a cavity for pooling water and gas. The water spray piece disposed independently can be pulled out after use to prevent reuse effectively.

In this embodiment, the dental handpiece also comprises a disposable light-emitting component; the handle is provided with a mounting site 18 for mounting the disposable light-emitting component; the disposable light-emitting component comprises a battery 19, an LED 20 and a cover plate 21; the bottom face of the mounting site 18 is provided with a guide slot 22 for guiding LED pins; the cover plate 21 is provided with a battery mounting slot; and the cover plate 21 or the handle 2 is provided with a guide port 23 allowing the head of the LED to pass. Light is emitted as long as the LED pins come into contact with the battery after the head of the LED is pushed in from the guide port, therefore, whether the dental handpiece is used can be simply and clearly identified with the disposable light-emitting component.

In this embodiment, a snap clip 24 is disposed on the side face of the mounting site, the side face of the cover plate is provided with a clip opening 25 matched with the snap clip 24, and the cover plate is fixed on the handle through the matching of the snap clip 24 and the clip opening 25.

What is claimed is:

1. A high-speed turbine dental handpiece adapted for single safe use comprising: a nose, a handle connected to a rear end of the nose, a plug connector disposed at a rear end of the handle, and a clip ring for fixing the handle and the plug connector, wherein the plug connector is provided with a first fixing slot at a side wall, a tail end of the handle is provided with a second fixing slot matched with the first fixing slot, an inner wall of the clip ring is provided with bumps matched with the first fixing slot and the second fixing slot, and when the clip ring is hooped on the plug connector, the bumps are embedded into the first fixing slot and the second fixing slot to limit and fix the handle and the plug connector.

2. The high-speed turbine dental handpiece adapted for single safe use of claim 1, wherein the dip ring is provided with a detachment opening at a side face.

3. The high-speed turbine dental handpiece adapted for single safe use of claim 1, wherein the clip ring is semicircular, the bumps are evenly distributed at an inner side of the dip ring.

4. The high-speed turbine dental handpiece adapted for single safe use of claim 3, wherein an extension strip extends from one end of the clip ring, a clip block is protrusively disposed on the outer surface at the other end of the clip ring, the extension strip is provided with a clip hole matched with the clip block, and after the clip ring is configured on the plug connector, the extension strip surrounds the plug connector and completely fixes the clip ring on the plug connector by the matching of the clip hole and the clip block.

5. The high-speed turbine dental handpiece adapted for single safe use of claim 1, wherein the rear end of the handle is provided with a delivery tube, a rubber seal block is also provided, a through hole is disposed in the middle of the rubber seal block which is plugged and connected to the delivery tube through the through hole, front and rear end faces of the rubber seal block are pressed and sealed when the plug connector is mounted at the rear end of the handle, and after the rubber seal block is pressed, an inner wall of the through hole and an outer wall of the delivery tube are pressed and sealed; and a flexible anti-return sheet extends from a tail end of the through hole in the rubber seal block, and a hole in the plug connector, matched with the through hole, has a cross-sectional area less than that of the anti-return sheet.

6. The high-speed turbine dental handpiece adapted for single safe use of claim 1, further including: a delivery tube, comprising a main air tube and a water spray tube, both of which are made of a thermally deformable material.

7. The high-speed turbine dental handpiece adapted for single safe use of claim 1, wherein a rear end face of a tail connector is provided with a groove which is internally provided with a water spray piece, a tail end of the water spray piece is provided with ports for air inlet and water inlet respectively, and a middle of the water spray piece is provided with a cavity for pooling water and gas.

8. The high-speed turbine dental handpiece adapted for single safe use of claim 1, wherein the dental handpiece also comprises a disposable light-emitting component; the handle is provided with a mounting site for mounting the disposable light-emitting component; the disposable light-emitting component comprises a battery, an LED and a cover plate; a bottom face of the mounting site is provided with a guide slot for guiding LED pins; the cover plate is provided with a battery mounting slot; and the cover plate or the handle is provided with a guide port allowing a head of the LED to pass.

9. The high-speed turbine dental handpiece adapted for single safe use of claim 8, wherein a snap clip is disposed on a side face of the mounting site, a side face of the cover plate is provided with a clip opening matched with the snap clip, and the cover plate is fixed on the handle through the matching of the snap clip and the clip opening.

* * * * *